Jan. 11, 1927.
C. F. MONTAG
1,614,144
JACKET CROWN GRINDER
Filed June 12, 1926
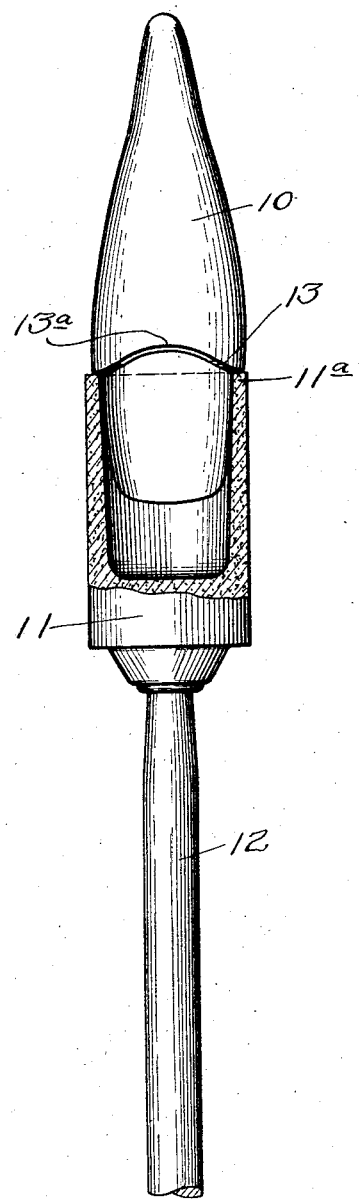
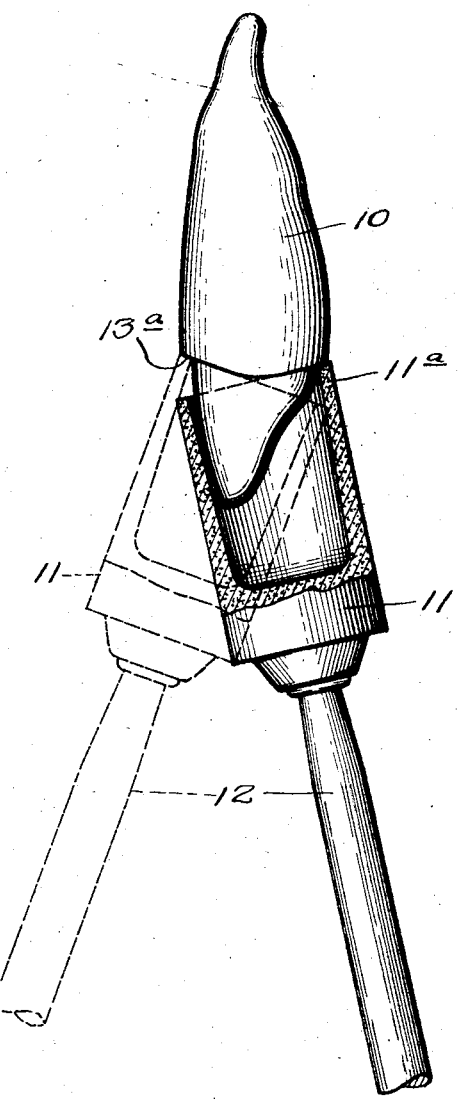
Inventor:
Christopher F. Montag, Patented Jan. 11, 1927.

1,614,144

UNITED STATES PATENT OFFICE.

CHRISTOPHER F. MONTAG, OF BLUE ISLAND, ILLINOIS, ASSIGNOR TO BLUE ISLAND SPECIALTY CO., OF BLUE ISLAND, ILLINOIS, A CORPORATION OF ILLINOIS.

JACKET-CROWN GRINDER.

Application filed June 12, 1926. Serial No. 115,564.

This invention relates to improvements in jacket-crown grinders, and more especially to such a grinder adapted for preparing a tooth in the mouth for the reception of a jacket crown.

By the use of my improved grinder, a tooth may be easily, quickly, and accurately shaped and prepared to receive a jacket crown. A regular square, even shoulder of proper depth and uniform thickness, with a core of proper size and shape may be formed in virtually one operation. In forming the shoulder it is also possible to give the same the desired curvature to make it follow the gum margin. For example, the upward curvature of the shoulder (on an upper tooth) on the labial and lingual sides of the tooth to make the shoulder follow the gum-line, is easily accomplished.

In using my improved grinder, there is very little, if any, danger of forming objectionable undercuts, cavities, sharp angles or corners. My improved grinder not only forms a proper shoulder but also shapes the core.

Other features and advantages of my invention will appear more fully as I proceed with my specification.

In that form of device embodying the features of my invention shown in the accompanying drawings, Fig. 1 is a vertical sectional front elevation of a grinder showing the same applied to an upper tooth, and Fig. 2 is a similar view in a side elevation.

As shown in the drawings, 10 indicates an upper tooth being shaped and prepared for the reception of a jacket crown. The grinder comprises primarily a cutting portion or head 11 and a shank 12, the latter adapted to be held in the chuck (not shown) of any suitable driving mechanism. The cutting member or head 11 is formed out of any suitable abrasive, grinding, or detergent, material such as, for example, carborundum. It is substantially cylindrical, and cup-shaped, the outer end being open. It is to be understood that grinders of various sizes are provided for different size teeth. The wall of the grinding head at the end, as indicated by 11$^a$ is slightly thicker than the width of the shoulder to be formed on the tooth. The wall, from the end of the head, toward the point of attachment to the shank preferably increases in thickness on a slight taper, as shown.

In the practice of the invention, the grinder is applied to the tooth as shown in Fig. 1, thus forming the core and cutting a shoulder entirely around the tooth in one operation. The slight tapering thickness of the wall of the grinder assists in preventing binding. By rocking the grinder forward and backward (for example, on a front tooth) as shown in Fig. 2, by the two positions in solid and broken lines, the shoulder, as indicated by 13, may be given the desired upward curvature at the front and back as indicated by 13$^a$ to cause the same to follow the gum-line. By such rocking movement, not only to the front and back, but to the sides, the core may be properly cut away, shaped, and formed without danger of leaving any objectionable undercuts, depressions, or cavities. The extreme end of the wall of the grinding head is preferably cut square so that the shoulder formed thereby will also be square, and not beveled or undercut.

Although I have shown a certain form of device embodying the features of my invention, it is to be understood that the same is capable of many modifications and variations; and it is my intention in the following claims to claim all novelty in my invention as broadly as possible in view of the prior art.

What I claim as new and desire to secure by Letters Patent is:

1. A jacket-crown grinder comprising a substantially cylindrical rigid hollow grinding head made of abrasive material open at the end, the edge of the same at the open end being cut square, and means for holding said head in the chuck of a driving mechanism.

2. A jacket-crown grinder comprising a substantially cylindrical rigid hollow grinding head made of abrasive material open at the end, the edge of the same at the open end being cut square, and the wall thereof increasing in thickness from the open end toward the other end; and means for holding said head in the chuck of a driving mechanism.

In witness whereof, I have hereunto set my hand this 5th day of June, 1926.

CHRISTOPHER F. MONTAG.